T. J. SHIPMAN.
APPARATUS FOR PRODUCING MONOLITHIC CONCRETE WALLS.
APPLICATION FILED MAR. 18, 1910.
1,055,237.
Patented Mar. 4, 1913.
5 SHEETS—SHEET 1.
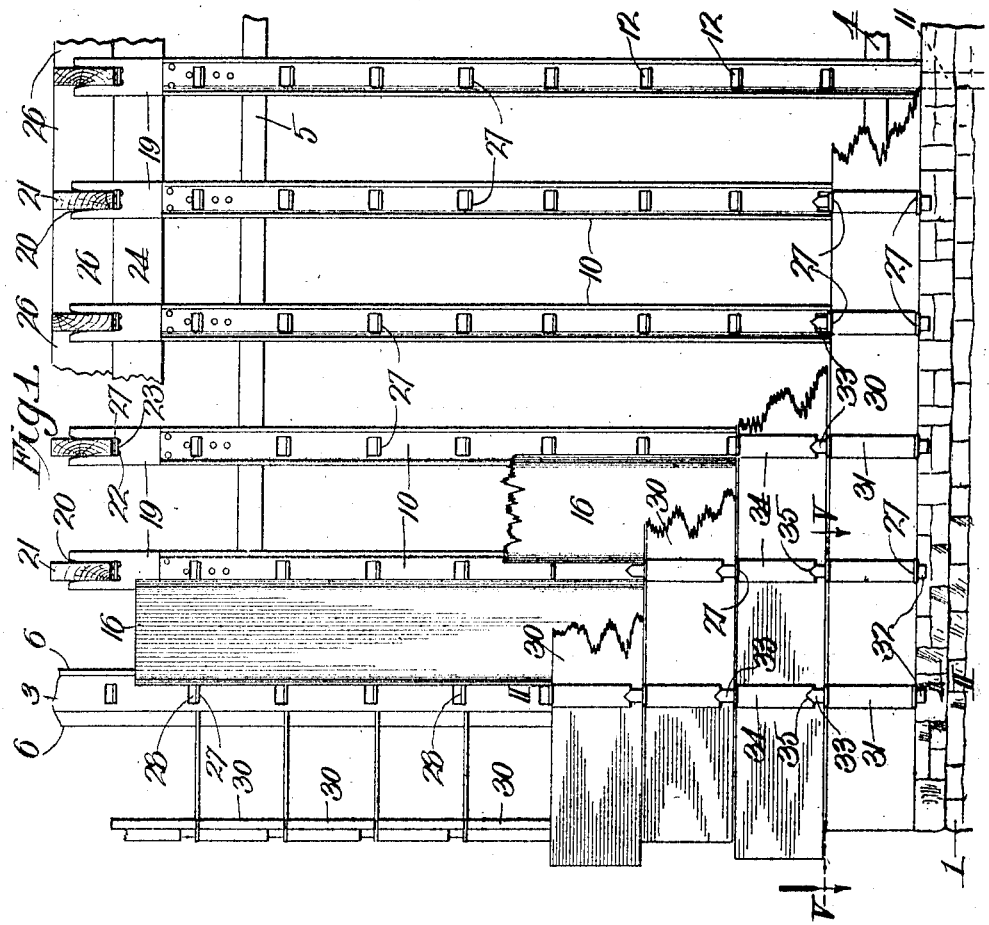

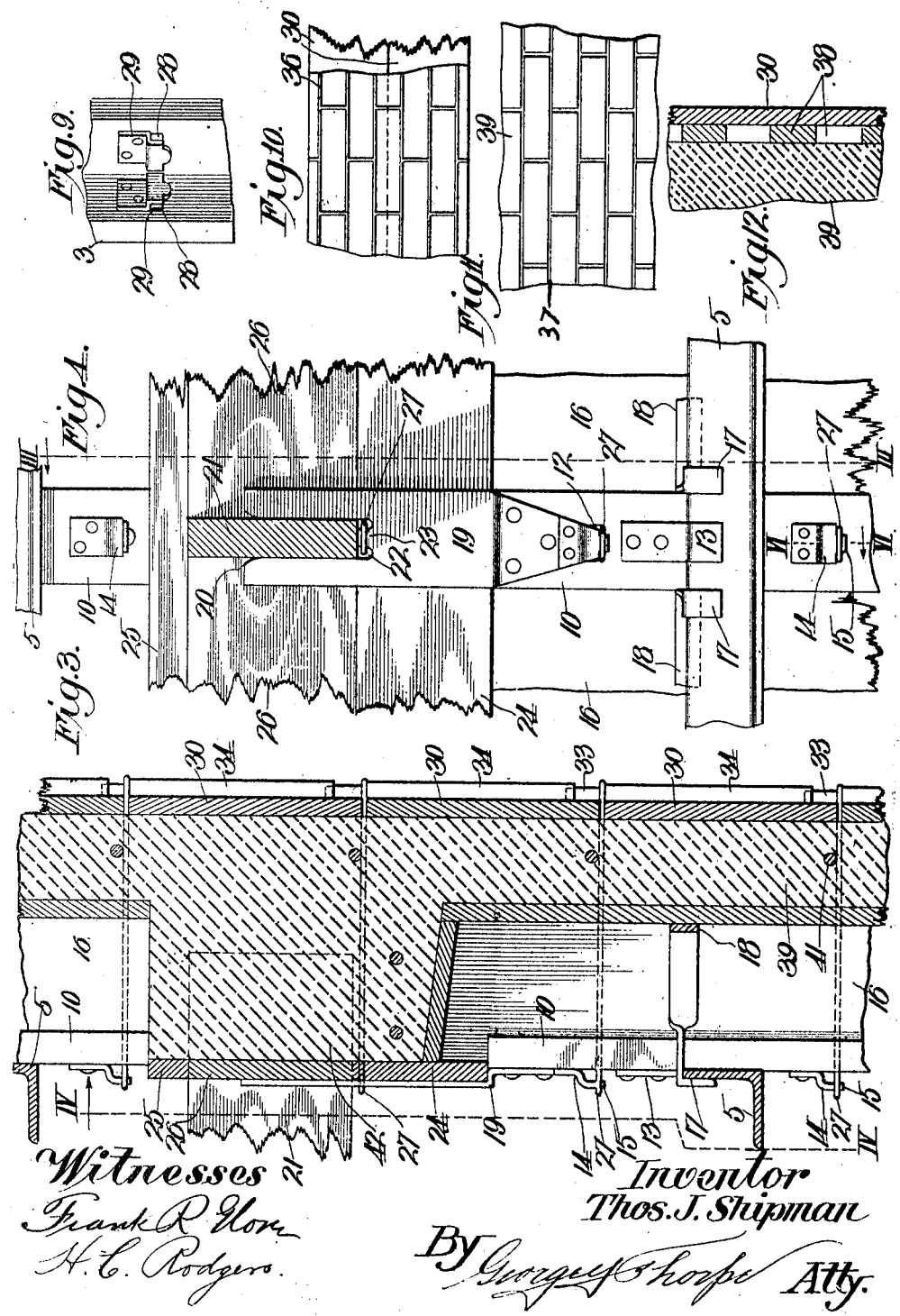

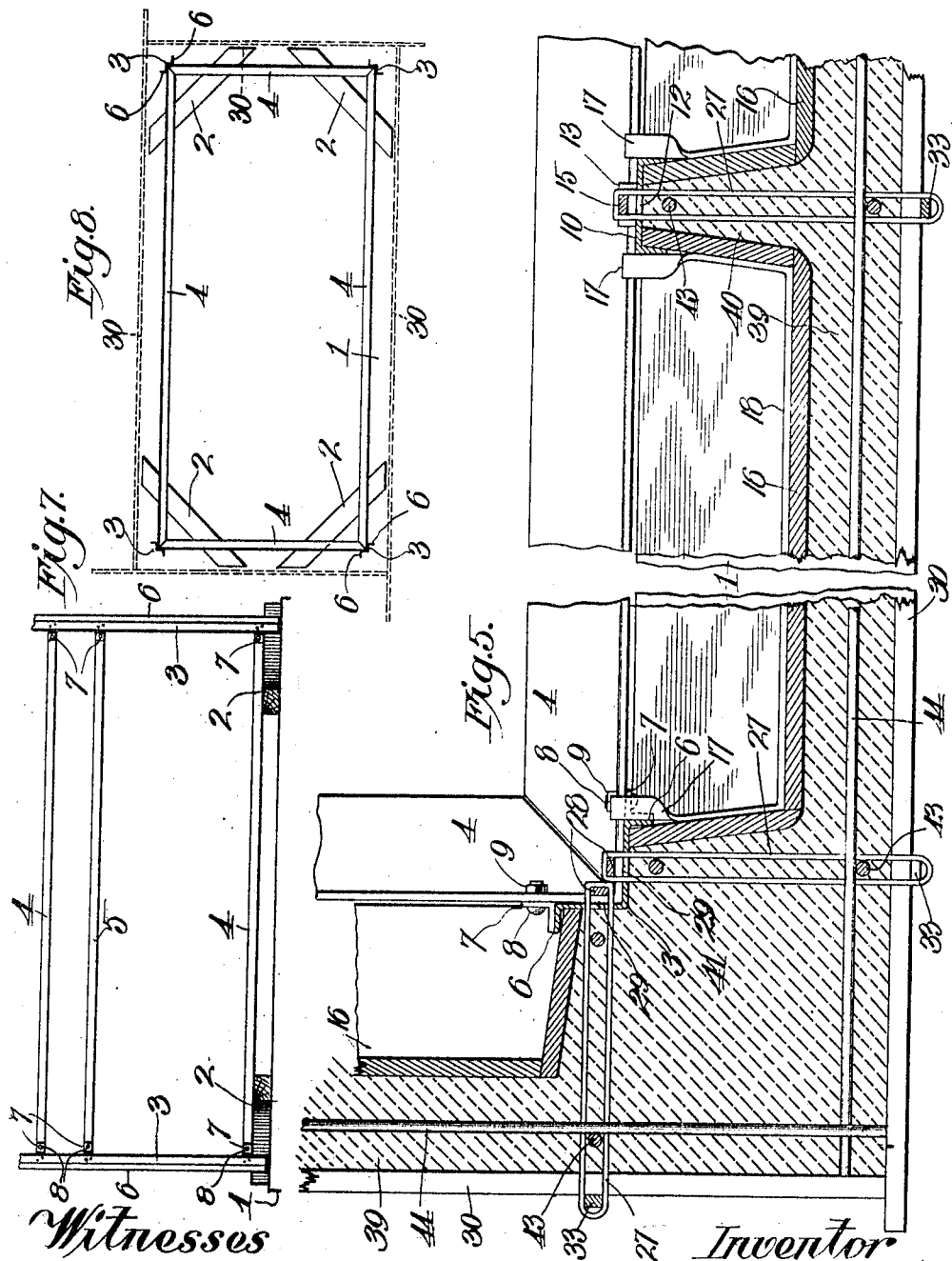

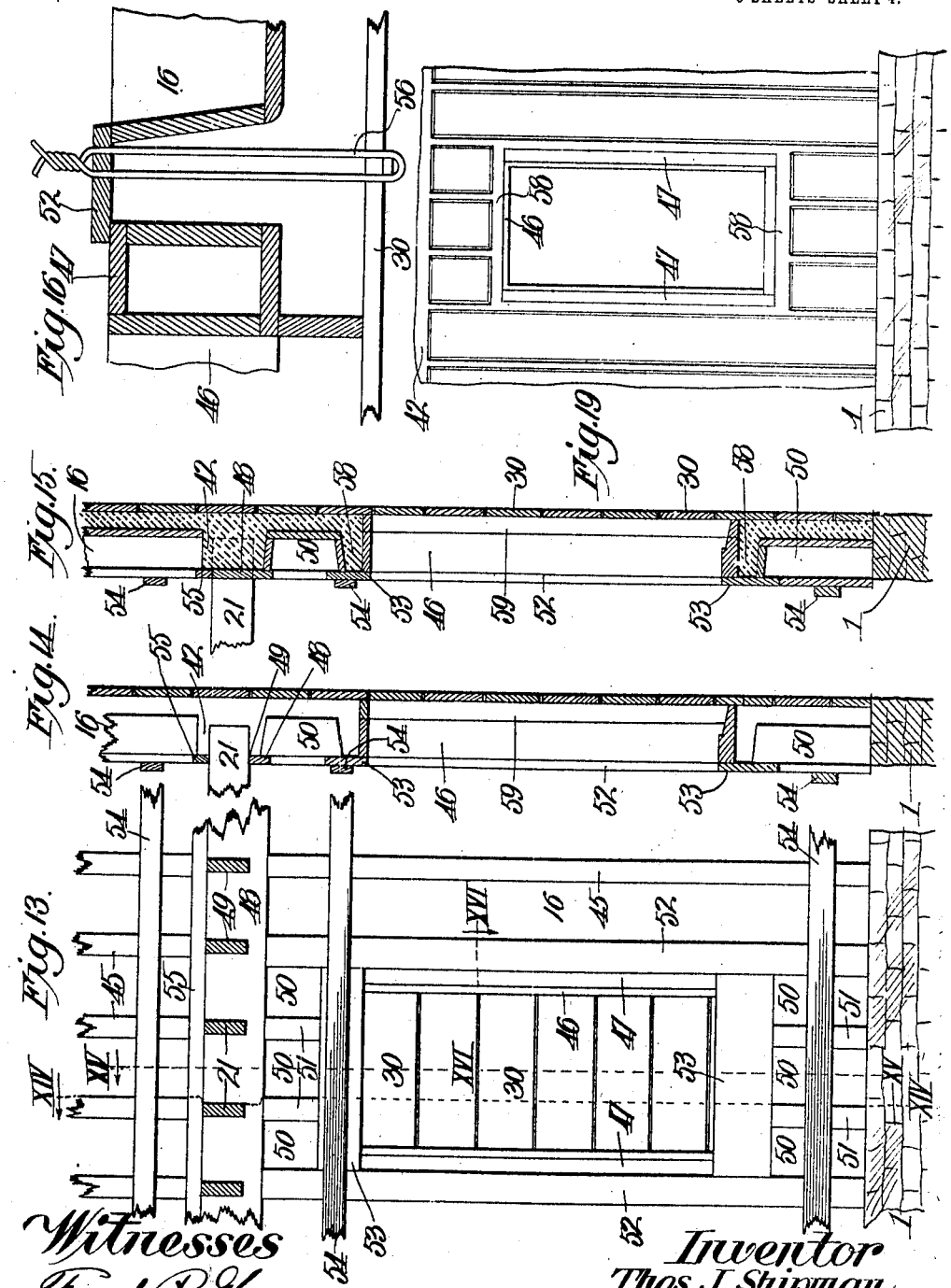

T. J. SHIPMAN.
APPARATUS FOR PRODUCING MONOLITHIC CONCRETE WALLS.
APPLICATION FILED MAR. 18, 1910.
1,055,237.
Patented Mar. 4, 1913.
5 SHEETS—SHEET 5.
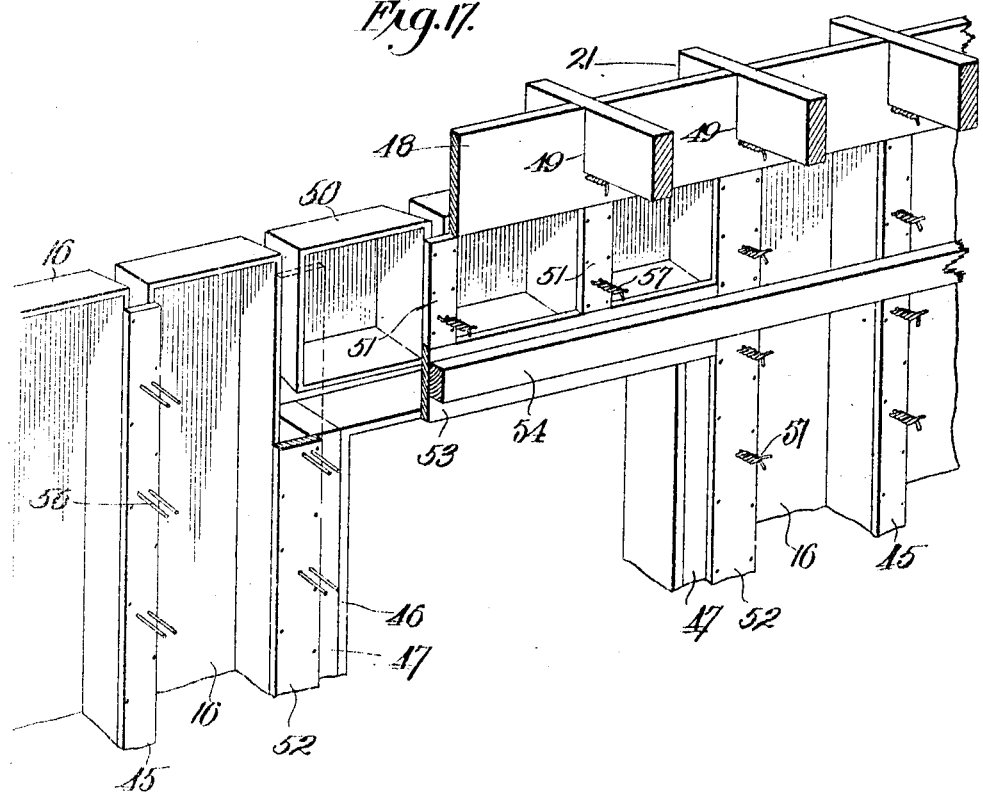
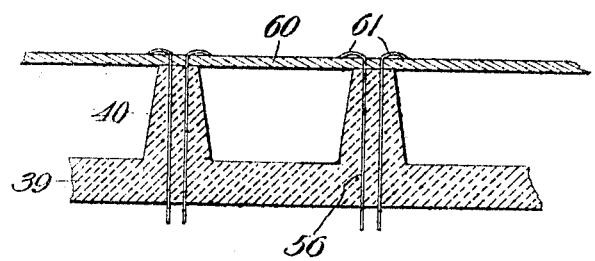
Witnesses
Frank R. Hon
H. C. Rodgers
Inventor
Thos. J. Shipman
By George J. Thorpe Atty.

UNITED STATES PATENT OFFICE.

THOMAS J. SHIPMAN, OF KANSAS CITY, MISSOURI.

APPARATUS FOR PRODUCING MONOLITHIC CONCRETE WALLS.

1,055,237.  Specification of Letters Patent.  Patented Mar. 4, 1913.

Application filed March 18, 1910. Serial No. 550,251.

*To all whom it may concern:*

Be it known that I, THOMAS J. SHIPMAN, a citizen of the United States, residing at Kansas City, in the county of Jackson and State of Missouri, have invented certain new and useful Improvements in Apparatus for Producing Monolithic Concrete Walls, of which the following is a specification.

This invention relates to apparatus for producing monolithic concrete walls, and my object is to produce apparatus whereby an entire monolithic concrete wall may be erected in courses without the necessity of delaying the work to await the setting of any particular course and hence with great rapidity.

A further object is to produce apparatus whereby access may be had to the entire surface of each course as the material is laid, for tamping purposes.

A further object is to produce simple and inexpensive apparatus which can be easily, quickly and reliably assembled and as readily removed when the wall has attained the required height.

With these general objects in view and others as hereinafter appear, the invention consists in certain novel and peculiar features of construction and organization as hereinafter described and claimed; and in order that it may be fully understood reference is to be had to the accompanying drawings, in which;

Figure 1, is an elevation of the outer side of the apparatus or false-work for erecting concrete walls, embodying my invention with certain parts broken away to expose parts otherwise hidden. Fig. 2, is a vertical section on the line II—II of Fig. 1. Fig. 3, is an enlarged vertical section on the line III—III of Fig. 4. Fig. 4, is a section on the line IV—IV of Fig. 3. Fig. 5, is a horizontal section on the same scale as Figs. 3 and 4, on the line V—V of Fig. 1. Fig. 6, is a vertical section on the line VI—VI of Fig. 4. Fig. 7, is a side view of a skeleton frame to form a support for the hollow vertical forms and certain vertical bars. Fig. 8, is a plan view of the same and also shows in dotted lines the arrangement of the facing boards for the concrete wall. Fig. 9, is an inner face view of a portion of one of the corner bars of the supporting frame. Fig. 10, is an inner face view of a pair of the facing boards equipped with ribs at its inner side. Fig. 11, is an outer face view of a part of a complete wall provided with grooves giving it a tile effect. Fig. 12, is a vertical section showing one of the facing boards, the concrete wall and tiling interposed between them. Fig. 13, is an inner face view of a modified type of construction, said figure also showing in vertical section a number of the second floor joists. Fig. 14, is a vertical section on the line XIV—XIV of Fig. 13. Fig. 15, is a similar view on the line XV—XV of Fig. 13. Fig. 16, is an enlarged horizontal section on the line XVI—XVI of Fig. 13 said figure being faced or arranged with its parts in the same relative position as the corresponding parts of Fig. 5. Fig. 17, is a sectional perspective view of a part of the apparatus. Fig. 18, is a horizontal section of a complete wall equipped with metal laths or plaster boards at its inner side. Fig. 19, is an internal elevation on a reduced scale of that part of a completed wall surrounding a window opening.

In the said drawings, 1 indicates an ordinary foundation for a building, built up in the regular way, and 2 supports extending across the corners of and resting upon the foundation of the lower floor joists, hereinafter referred to. A skeleton frame preferably of metal, consists of the corner standards 3, connected together by horizontal side and end bars 4, two sets of said side and end bars being shown in Fig. 7, the lower one being designed as a support for the lower ends of certain vertical forms and bars of the first floor, and the upper one for the lower ends of similar forms and bars of the second floor, and 5 are similar bars, a suitable distance above the lower bars 4, as a support for the upper ends of the first-floor forms and bars, similar bars 5, not shown being adapted to support the upper ends of the forms and bars of the upper floor, it being understood that the sets of bars 4 and 5 will be duplicated for each floor. The corner standards which are preferably of right-angle form as shown most clearly in Figs. 5 and 8 are provided with outturned flanges 6 which overlie, see Fig. 8, without resting on the foundation and secured to said flanges at the proper heights are angle brackets 7 through which bolts 8 extend through the correspondingly located bars 4 or 5, retaining nuts 9 engaging the inner ends of said bolts to secure said bars 4 and 5 removably to said angle brackets, (see Fig. 5).

10 are channel bars fitted vertically against the outer sides of each set of bars 4 and 5, and arranged at distances apart corresponding to the joists, the lower ends of the channel bars of the first floor terminating in the plane of the upper faces of the floor joists 11, as shown in Fig. 2, and in one place in dotted lines in Fig. 1, and said channel bars are provided at regular intervals with openings 12, for a purpose which hereinafter appears, and in order to support the channel bars in the proper position they are provided near their upper and lower ends and inner sides with down-turned hooks 13, to engage the upper edges of bars 4 and 5 of the corresponding floor, see Figs. 2 and 4, and are also provided at their inner sides just above the openings 12, with downturned hooks 14 terminating in reduced ends 15, for a purpose which hereinafter appears.

16 are hollow wood or metal forms open at their inner sides. Said forms are arranged outward of the channel bars and corner bars and the side walls of those adjacent to the corners of the building, bear against the outer sides of the corner bars between the flanges 6 thereof, the opposite walls of said corner forms fitting in the adjacent channel bars and against the outer sides of the same and the adjacent flanges thereof. The remaining forms 16, each bridge the space between a pair of the channel bars and bear against the same and the adjacent flanges thereof, as shown clearly in Fig. 5. By this arrangement it will be seen that the vertical forms are spaced apart, and in order to support them in the positions described, they are provided with inwardly-projecting and down-turned hooks 17, for engagement with the adjacent bars 4 and 5, of the frame hereinbefore described, such arrangement being shown clearly in Figs. 3 to 5 inclusive. The hooks of each form constitute the terminals of U-shaped bars 18 arranged transversely of and secured to the inner sides of the forms to brace and stiffen the same, though it will be understood that the forms and hooks may be of integral formation.

The channel bars may terminate short of the upper ends of the forms as shown clearly in Figs. 1 and 3, and are provided with offsetting extensions or plates 19 projecting upward beyond and spaced inward of the upper ends of said forms as shown in the last-named figure, the upper ends of said channel bar extensions being bifurcated as at 20, to receive and form a support for the second floor joists 21, and by preference, said extensions or plates will be recessed as at 22 to provide tongues 23, which form the direct support for said joists, and for an additional purpose hereinafter mentioned.

24 are horizontal boards or plates which rest edgewise upon the upper ends of the channel bars and fill the spaces between the extensions thereof and the upper ends of the forms, said bars projecting above the forms, and engaging the lower edges of the joists 21. Similar but preferably narrower bars 25, rest upon the joists at the lower ends of the channel bars and forms of the second floor, (see Fig. 5) and short bars 26 are interposed between the joists and bars 24 and 25 in the vertical plane of the latter. It will thus be seen that said bars 24, 25 and 26 constitute a wall or backing for the space between the forms of the first and second floors and that through said wall the joists project into said spaces.

27 are wire tie-loops which are arranged horizontally adjacent to and outward of the walls of the forms and which project at their inner ends a slight distance through the openings 12 of the channel bars, the corner tie-loops likewise projecting through openings 28 in the corner bars of the frame hereinbefore mentioned as shown clearly in Fig. 5. The loops are of equal length and project relatively a considerable distance beyond the outer sides of the forms, and all extending through the channel bars are engaged by the reduced ends 15 of the downturned hooks 14 carried by said channel bars, the body portion of said hooks overlying the side portions of the loops, as shown most clearly in Fig. 4. The tie loops which extend through the corner bars, are engaged by similar down-turned hooks 29, secured to the corner bars as shown in Fig. 9. Similar tie loops 27, are arranged above each channel bar and are engaged by the tongues 23 forming a support for the second floor joists, as shown in Fig. 4. A series of similar tie loops 27 are also arranged by preference on the foundation as shown in Figs. 1 and 2, the outer ends of all of the tie loops terminating a slight distance outward of the outer side of the foundation as shown most clearly in Fig. 2.

30 indicates superposed horizontally-arranged boards arranged upon the foundation at its outer edge and spaced outward of the forms the distance required for the body of the concrete wall, said boards being arranged between adjacent series of tie-loops, it being noted in this connection that the latter are of small-gage wire so that the edges of adjacent boards shall be in substantial engagement to guard against the production of horizontal seams on the outer face of the wall when complete, though it is to be understood that the wall will in most cases receive a finishing coat of cement which will obliterate or cover any seams which might otherwise appear. Practically no seams will appear, because the tie loops will embed themselves in the edges of the boards.

In practice the lowest tier of boards is placed upon the foundation, and the tie loops and the tier of tie loops next above, and in order to support said tier of boards perpendicularly on their edges they are provided with cleats 31 having reduced depending tongues 32 to extend through the underlying tie loops. Said cleats are also provided with reduced tongues 33, projecting upward through the second tier of tie loops, and the upper ends of the tongues 33 are preferably pointed. By reference to the dotted lines Fig. 8, it will be seen that the boards of the ends and sides are arranged flush at one end and that at their opposite ends they fit against the inner ends of the adjacent end and side boards. By this arrangement it will be apparent that the length of the boards is immaterial provided they exceed the length or width of the building as the case may be, and that consequently no time need be lost in sawing boards to certain lengths. After the lowest tier of boards are arranged around the frame and the forms and channel bars carried thereby, concrete is shoveled or otherwise deposited in the space inclosed by said boards, and it will be noticed in this connection that the entire surface of the concrete is accessible for thorough tamping, it being also understood that if in tamping between the forms near the channel bars, the tamping tool happens to strike upon one of the tie loops resting upon said tier of boards, it will not be dislodged because its inner end is interlocked with one of the hooks 14 of the adjacent channel bar. Immediately the tamping operation is completed and without waiting for the concrete to set, a second tier of the boards 30 is arranged upon the first, the second tier having cleats 34 which correspond in all respects to cleats 31 except that they terminate short of the lower edges of the boards and are provided with notches 35 at their lower ends to receive the pointed upper ends of projections 33 of the cleats of the lower tier of boards, the upwardly-projecting portions 33 of the cleats of the second tier of boards extending through the tier of tie loops overlying said second tier of boards.

In building an ordinary wall there is no special necessity for centering the cleats of the different tiers of boards vertically one above the other, but it is important in the event that the boards are equipped with ribs at their inner sides so arranged as to produce grooves in the face of the concrete wall, these grooves being adapted to give the concrete the appearance of tiling. The ribs may be of such configuration as to give any other desired ornamental appearance to the face of the wall.

In Fig. 10 the inner face of a pair of the boards are shown as equipped with ribs 36 to give a tile effect to the wall. If the boards are equipped with ribs or other means for giving a tile effect to the wall, it is of course important that the boards shall bear a predetermined relation so that the grooves 37 (see Fig. 11) shall be produced by the ribs at predetermined points on the wall. The necessity for arranging the boards in certain relations is also important where it is desired to secure tile 38 or other finish to the surface of the wall by causing the tile to adhere temporarily to the boards so that when the former are removed the tile will remain as a facing for the wall. (See Fig. 12).

As each tier of boards is arranged as described, the space inclosed is filled with concrete and the latter is tamped, so that eventually a monolithic concrete wall 39 is produced corresponding in thickness to the space between the forms and the boards and provided at intervals with vertical ribs 40 and 41, the former being those produced outward of the bars 10 and the ribs 41 between the corner standards and the adjacent boards 16. In the vertical plane of the ribs 40 of the first and second floor walls and between the upper end of the first floor forms and the lower ends of the second floor forms, a horizontal concrete rib 42 is produced and embedded in the same are the ends of the joists of the second floor as shown most clearly in Fig. 3. This method of construction is continued until the desired height of the wall is attained, it being understood of course that if it is desired to reinforce the wall with vertical reinforce rods as shown in Figs. 2 and 5, such rods 43 may be retained in substantially a vertical position by slipping them through the superposed series of tie loops before any concrete is introduced, and as the wall is built up horizontal reinforce rods 44 may also be placed in the wall. For small buildings the use of reinforce rods will not be necessary. If preferred the corner standards of the frame may extend downward to the bottom of the foundation pit and rest upon the bottom thereof, in which case the supports 2 will of course be unnecessary.

When the walls are complete the erecting parts can be readily removed, the first step in such removal being to dismantle the supporting frame, by disengaging bars 4 and 5 from the corner standards. After the bolts 8 are removed the bars 4 and 5 can be permitted to drop downward until they are disengaged from the hooks 13 of the channel bars, and 17 of the hollow forms. the supports 2 being first displaced, if employed. The channel bars are then disengaged from the tie loops preferably by severing the latter at their inner ends. If preferred the inner ends of all of the tie-loops except those engaging tongues 23, may be bent downward to disengage them from the hooks 14 and thus permit the channel bars to be first swung inward at their lower ends until their flanges clear the foundation and then pulled downward to effect the disengagement of the tongues 23 from the topmost series of tie-loops.

The hollow forms are pulled inward to withdraw them from the hollow portions of the concrete wall. The outer ends of the tie-loops are preferably cut to permit the boards 30 to be removed and then said tie loops are preferably cut away flush with the face of the wall, the ends being eventually covered by a finishing coat of cement upon the wall, or by a coating of waterproof or other paint or coloring matter with which the face of the wall may be treated, or the wall may be veneered with tiling as hereinbefore suggested and as shown in Fig. 12 or with brick, stone or other material, in which event the severed outer ends of the wire loops will be utilized in the customary manner as an anchorage for such veneering. If it is desired to produce what is known as an all cement or concrete building a concrete floor of any suitable type is made as a substitute for the joists.

In sheets 4 and 5, a modified construction is shown and in such construction, all of the parts may be of wood if desired, this modified construction being preferably employed in the erection of cheaper buildings such as small barns, poultry houses and analogous structures.

Referring now to Figs. 13 to 16 inclusive, it will be seen that the part of a wall having a window opening is shown. In said figures the forms 16 are connected at their inner edges by vertical bars 45 corresponding in function to the channel bars and in this case the forms will preferably be tied together by said bars and rest upon the foundation instead of being suspended from a knock-down frame. Two of the forms are spaced sufficiently to accommodate a window frame 46 between them, said frame being preferably equipped at its outer sides with the customary sash-weight boxes 47. In this construction, as in the other, the form will terminate a short distance below the joists 21 of the second floor and the latter will be supported in notches 49 in horizontal boards 48 standing edgewise and secured to and projecting above the forms and in engagement with the upper ends of the bars 45. Between the two forms 16 directly flanking the window casing, a suitable number of short forms 50 are arranged, it being understood that similar short forms will be arranged below the window frame, and connecting the inner edges of said short forms are short bars 51, corresponding in function to bars 45. 52 are bars corresponding in function to bars 45 and bars 51 but preferably wider so as to bridge the spaces between and connecting the window frame or rather the boxes 47 thereof and the adjacent walls of the adjacent forms 16, said bars 52 also projecting upward so as to connect the last-named forms 16 and the adjacent short forms 50 and bridging the space between the upper end of the window casing and the lower edges of the superposed short forms and extending from one bar 52 to the other, is a horizontal bar 53, a similar bar 53 performing the same service at the lower end of the window casing. 54 indicates a pair of 2x4's arranged horizontally and fitting against the inner sides of bars 45, 51 and 52, to secure the same against lateral movement, the upper 2x4 being also shown as secured to the upper bars 53 to aid in holding the latter in place. 55 is a narrow plank fitting edgewise upon the board 48 and corresponding in function to boards 25 of the construction shown in Sheets 1 to 3 inclusive, that is to say they project upward to about the plane of the second floor forms, board 48 subserving the same function as boards 24 and 26 of the construction shown in such sheets. Bars 45, 51 and 52 are equipped with tie-loops 56 of originally hair-pin form, their inner ends being twisted together at 57 to secure them to the bars, in order to guard against any possible chance of dislocation during the process of erecting the wall, the tie-loops extending through the spaces between the forms, as in the construction shown on Sheets 1 to 3 inclusive, it being understood that the boards 30 are arranged in superposed relation edgewise outward of the forms, as hereinbefore explained and are likewise engaged with the outer ends of the tie-loops as shown in Figs. 1 to 5 inclusive, the securing cleats and tie-loops being omitted from Figs. 13 to 16 inclusive.

By reference to Figs. 13 to 17 inclusive it will be seen that in the completed wall there will be solid horizontal ribs 58 between the upper and lower ends of the casing and the short forms, (see Figs. 14 and 15) and that above the short forms overlying the window casing will be a rib 42 in which the ends of the joists are embedded, it being also noticed by reference to Fig. 15, that the space between the boards 30 and the outer edge of the window casing is temporarily filled by the rectangular frame 59 to prevent concrete entering the window opening.

To remove the erecting parts, the 2x4's are first removed and then the upright bars 45, 51 and 52 are removed, after the twisted ends of the tie-loops are disengaged, certain of them being as shown in Fig. 17, bars 53 being also removed.

It will be apparent that the inner ends of the tie-loops in both cases may be utilized as a means for securing to the inner side of the concrete wall the customary metal lath or plaster board 60, as indicated in Fig. 18, and thus eliminate the necessity for embedding nailing strips in the inner side of the wall, it being noticed by reference to the last-named figure that the tie-loops extend through the metal lath or plaster board and are bent back against the inner side of the same as at 61, to hold it in position.

From the above description it will be apparent that I have produced apparatus for producing a monolithic concrete wall reinforced by vertical stiffening ribs at its inner side and by a horizontal rib between the ends of the vertical ribs of the first and second stories, and in which air spaces are provided between said vertical ribs and above and below the horizontal rib to guard against the access of moisture to the interior plaster or finish with which the plaster boards or metal laths is equipped in the completed wall and while I have illustrated and described the preferred embodiment of the invention it is to be understood that I reserve the right to make such changes as properly fall within the spirit and scope of the appended claims.

Having thus described the invention what I claim as new and desire to secure by Letters Patent, is:—

1. In concrete wall construction apparatus, a plurality of tiers of hollow open vertical forms, the individual forms of each tier being spaced apart and arranged with their open sides facing inward, upright bars bridging the spaces between and arranged at the inner edges of the forms of each tier, and boarding fitting against the inner edges of the forms and reaching from the upper edges of the upright bars of one tier to the lower ends of the upright bars of the next tier above.

2. In concrete wall construction apparatus, a plurality of tiers of hollow open vertical forms, the individual forms of each tier being spaced apart and arranged with their open sides facing inward, upright bars bridging the spaces between and arranged at the inner edges of the forms of each tier, boarding fitting against the inner edges of the forms and reaching from the upper edges of the upright bars of one tier to the lower ends of the upright bars of the next tier above, and joists extending through the boarding into the space between adjacent tiers of forms.

3. In concrete wall construction apparatus, hollow open vertical forms spaced apart, upright bars connecting the forms, plates carried by and projecting beyond the upper ends and disposed inward of the said bars, and a boarding between said plates and the forms and extending beyond the upper ends of the latter.

4. In concrete wall construction apparatus, hollow open vertical forms spaced apart, upright bars connecting the forms, plates carried by and projecting beyond the upper ends and disposed inward of the said bars, a boarding between said plates and the forms and extending beyond the upper ends of the latter, and joists extending through said boarding and into the space between adjacent tiers of forms.

5. In concrete wall construction apparatus, the combination of adjacent series of superposed tiers of forms, boarding arranged at the inner sides of the lower tier of forms and extending from the upper ends thereof to the lower ends of the other tier, a vertical boarding arranged outward of the forms and the space between the tiers thereof, ties extending through said space and the first and last named boardings, and means for securing said ties in position to hold said boardings in fixed relation to each other.

6. In concrete wall construction apparatus, the combination of adjacent series of superposed tiers of forms, boarding arranged at the inner sides of the lower tier of forms and extending from the upper end thereof to the lower end of the other tier, a vertical boarding arranged outward of the forms and the space between the tiers thereof, upright plates arranged in the vertical planes of the spaces between the individual forms and in fixed relation to and projecting upwardly beyond the upper ends of the lower forms and fitting against the inner sides of the first-named boarding, and bifurcated at their upper ends and provided with upwardly projecting tongues at the lower ends of said bifurcations, joists extending through the said bifurcations and the first named boarding and projecting into the space between the two tiers of forms, ties extending through said space and the boardings below said joists and secured at their inner ends to the tongues of said bifurcated plates, and means engaging the opposite ends of the ties to hold the other boarding firmly in position.

7. A concrete wall construction apparatus, comprising a plurality of suitably supported hollow open forms arranged vertically with their open sides facing inward, upright bars bridging the spaces between the forms and provided with openings communicating with said spaces, a boarding arranged vertically outward of and spaced from the forms, tie connections extending through the spaces between said forms and projecting at their inner ends through said upright bars and at their outer ends through said boarding, downwardly disposed hooks secured to the said bars and engaging the inner ends of said tie connections and means connecting the said boarding with the outer ends of said tie connections to prevent outward movement of the said boarding.

8. Apparatus for producing concrete walls, comprising a plurality of suitably supported hollow open forms arranged vertically with their open sides facing inward, vertical bars bridging the spaces between the inner edges of the forms and provided with openings communicating with such spaces, horizontal boards arranged edgewise one upon another outward of and spaced from the forms, tie connections extending through the spaces between said forms and projecting at their inner ends through said bars and extending between said boards, downwardly-disposed hooks secured to the inner sides of said bars and extending through the inner ends of said connections, and means at the outer sides of said boards detachably engaged with the outer ends of said tie connections.

9. In concrete wall construction apparatus, a frame consisting of upright angle bars provided at their free margins with outturned flanges, hollow open forms arranged vertically and disposed at right angles to each other with their open sides inward, one of the side walls of one of said forms fitting against the outer side of one arm of the angle iron and the outer side of the out-turned flange of said arm, and the other form fitting against the outer side of the other arm of the angle iron and the outer side of the outturned flange of said arm, boardings arranged vertically outward of and spaced from said forms and at right angles to each other, and abutting together at their adjacent ends, a pair of tie connections extending through the arms of the angle iron and the boardings parallel thereto and secured in rigid relation to said angle irons and said boardings.

In testimony whereof I affix my signature, in the presence of two witnesses.

THOMAS J. SHIPMAN.

Witnesses:
HELEN C. RODGERS,
G. Y. THORPE.